(12) United States Patent
Tsao

(10) Patent No.: US 7,418,702 B2
(45) Date of Patent: Aug. 26, 2008

(54) CONCURRENT WEB BASED MULTI-TASK SUPPORT FOR CONTROL MANAGEMENT SYSTEM

(75) Inventor: Sheng (Ted) Tai Tsao, 2979 Heidi Dr., San Jose, CA (US) 95132

(73) Assignee: Sheng (Ted) Tai Tsao, San Jose, CA (US)

( * ) Notice: Subject to any disclaimer, the term of this patent is extended or adjusted under 35 U.S.C. 154(b) by 993 days.

(21) Appl. No.: 10/713,904

(22) Filed: Aug. 6, 2002

(65) Prior Publication Data

US 2004/0215791 A1    Oct. 28, 2004

(51) Int. Cl.
G06F 9/455 (2006.01)
G06F 9/46 (2006.01)
G06F 7/04 (2006.01)
G06F 15/16 (2006.01)
H04L 9/00 (2006.01)

(52) U.S. Cl. ............... 718/1; 718/100; 726/2; 713/155; 709/229

(58) Field of Classification Search .......... 718/100, 718/1; 726/2; 713/155; 709/229
See application file for complete search history.

(56) References Cited

U.S. PATENT DOCUMENTS 6,035,404 A * 3/2000 Zhao .................. 726/6
2002/0152305 A1* 10/2002 Jackson et al. ........... 709/224
2003/0084128 A1* 5/2003 Anderson et al. ......... 709/220

* cited by examiner

Primary Examiner—Meng-Al T. An
Assistant Examiner—Kenneth Tang

(57) ABSTRACT

Supporting multiple users concurrent login and providing each user to be able to perform multiple concurrent tasks in his/her computer work environment are very critical to modem computer user working environment, which is running on top of modem operating system, due to it greatly improved machine efficiency and user's productivities. Therefore, supporting multiple users concurrent login CCDSVM through each user's web-browser and providing each user to be able to perform multiple concurrent tasks in his/her single login web-browser over resources of CCDSVM will qualify the conventional web-browser to be a new means of a computer user working environment at the Internet era.

To support one or multiple users to perform multiple concurrent tasks within a single web-browser for system like CCDSVM, the software modules on systems of CCDSVM require to work and communicate together to collect resource information of CCDSVM, and to display them in each user's web-browser, and further to allow each user selecting the resource, initiating and submitting the tasks from said single web- browser; the software of CCDSVM needs to store each received task information into a user space task list and further to distribute each task to the target system for executing. In addition, software of CCDSVM needs to obtain associated conventional or non- conventional locks for each task and properly release these acquired locks one at a time in the order during each tasks executing up to the point when the tasks are finished.

14 Claims, 7 Drawing Sheets

Console support in a Simple Environment

Console support in a Simple Environment

Data traveling between web-console and console supporting software a) Data Path 1:
Referred as sending data from web-console (9 of Fig. 2) to console support software (6 of Fig. 2) or referred as console supporting software (6 of Fig. 2) get data from web-console (9 of Fig. 2).

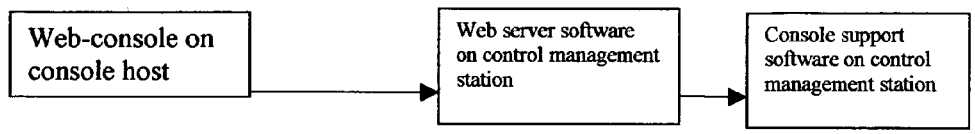

b) Data Path 2: (reverse path)
Referred as sending data from console supporting software (6 of Fig. 2) to web-console (9 of Fig. 2) or referred as web-console (9 of Fig. 2) gets data from console supporting software (6 of Fig. 2)

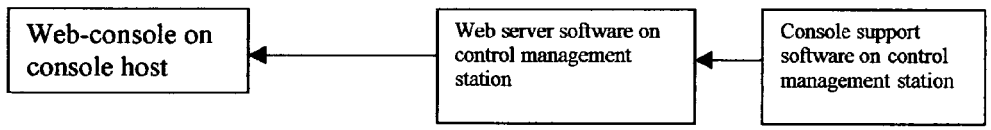

Fig. 3

Basic Task & Operation Processing Flow Chart in a CCDSVM environment.

A Layered CCDSVM structure

The typical hardware components of control management station, system units, and console hosts.

CONCURRENT WEB BASED MULTI-TASK SUPPORT FOR CONTROL MANAGEMENT SYSTEM

FIELD OF THE INVENTION

The present invention generally relates to computer communications network. More specifically, the present invention relates to a web based central controlled distributed scalable virtual machine system ("CCDSVM").

BACKGROUND OF THE INVENTION

A typical computer system provides a computer user work environment to end users, wherein the computer user work environment runs on top of a generic computer operating system. With this work environment, an end user can login to the system and setup various computer resource access controls for each individual preference based on his or her permitted role. The users, for example, can configure computer resources such as disks, networks, file folder/directory systems, and others. Various computer tasks & operations can be executed by the computer application, and the computer operating system of the system provides the results of tasks to the end user. Specially, with a generic computer operating system, this work environment allows multiple concurrent users and each of them to run multiple concurrent tasks or operations simultaneously. The computer user work environment has evolved from paper tape & punch card environment, command line environment on a native system to window & mouse click environment on a native system in the past. This invention provides users a web-based computer user work (operating) environment on top of generic operating system for a single or multiple computers and to allow user work on one or multiple computer systems through a conventional web-browser.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3 illustrates an example of basic data flow between a web-console on a console host and the console supporting software in a control management environment.

BRIEF DESCRIPTION OF THIS INVENTION

Figure 1:
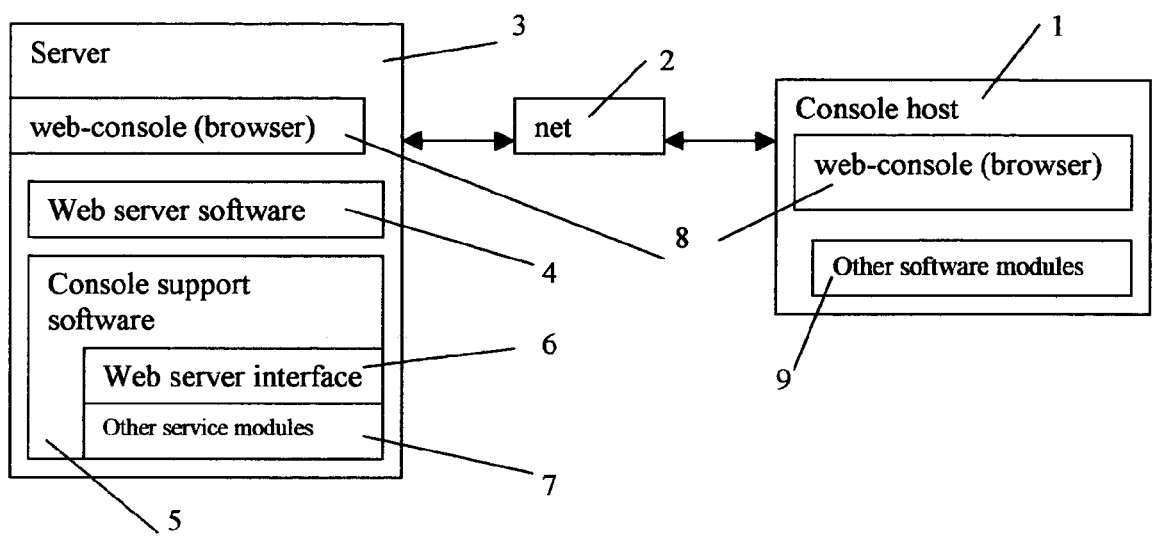
FIG. 1 illustrates an example of a simplified multi-tasks support on Web-console in a simple environment.

The traditional web server or other server (3 of FIG. 1) may support users from a web browser (8 of FIG. 1) somewhere on the net to perform some tasks, which could get quick responses and could be finished in a short period of time such as checking web server's status or getting a server's other information, et cetera. However, it may not support well for multiple simultaneous concurrent tasks or operations from the same web-browser, especially when these tasks are time consuming to finish. For example, creating a 60 GB file system on the server, or configuring a raid controller on that server (3 of FIG. 1) is a large (and time consuming) task. Because these tasks often take a large amount of time and will hang in the web-console on console host (1 of FIG. 1), as a result, no other tasks could be performed parallel from the same web-console at the same time. In addition, traditional console supporting software (5 of FIG. 1) does not work for a more complicated environment such as in a CCDSVM environment (FIG. 2).

To solve these problems and effectively to support multiple simultaneous concurrent tasks on a web-console for both simple and CCDSVM environment, the console supporting software (5 of FIG. 1) needs to include additional control management software modules (4 of FIG. 2) and others. The control management software module shall communicate and control all system units (3 of FIG. 2). Also, each system units (3 of FIG. 2) needs service software modules (8 of FIG. 2) to communicate with control management software (4 of FIG. 2) of console support software (6 of FIG. 2). In addition, a user space task list (FIG. 5) could be used together with conventional or non-conventional locks to support all multiple simultaneous concurrent tasks and operations. With this invention, the multi-tasks support on the web-console in a simple environment (FIG. 1) has been viewed as a special case of such support in a CCDSVM environment (FIG. 2). The CCDSVM (FIG. 2) will be degenerated into a simple server environment (FIG. 1) if multiple system units (3 of FIG. 2) do not present.

These and other features, aspects and advantages of the present invention will become understood with reference to the following description, appended claims and accompanying figures set forth below.

DETAILED DESCRIPTION OF THE INVENTION

CCDSVM is configured to provide a control management station to control a group of systems and provide distributed services to at least one client system over an Intranet, an Internet as well as a LAN environment. The software components of CCDSVM form the virtual operating environment.

When a server provides software support, which allows a user access the server and performs system operations on this server, a web-browser on a system (such as a desktop, laptop, server, PDA, or cell phone), which can be anywhere on net, this special web-browser of that system becomes a web-console. With CCDSVM, a permitted user from web-console should be able to access and operate entire CCDSVM.

To simplify the discussion, the term of thread and process are roughly used without differentiation between them in this invention regardless the very restricted definition of the thread and process in computer science field. Here both thread and process are basically referred as a sequence of instructions based on a piece of program code, which starts to be executed by a computer system step by step and further to carry out a computer task.

Lock is a mechanism that allows a thread to look a computer resource for its own use and prevents other threads, which attempt to manipulate this same resource at the same time, from access to the same computer resource. There is conventional lock, which can be acquired and released by the same thread. The conventional lock mechanisms have used by most software developer crossing the software industry. The lock described in this invention may or may not be a conventional one. The non-conventional lock mechanisms created in this invention can be acquired by one thread and may be released by same thread or by another thread. Therefore, it is non-conventional lock serving threads on the native system.

Figure 2:
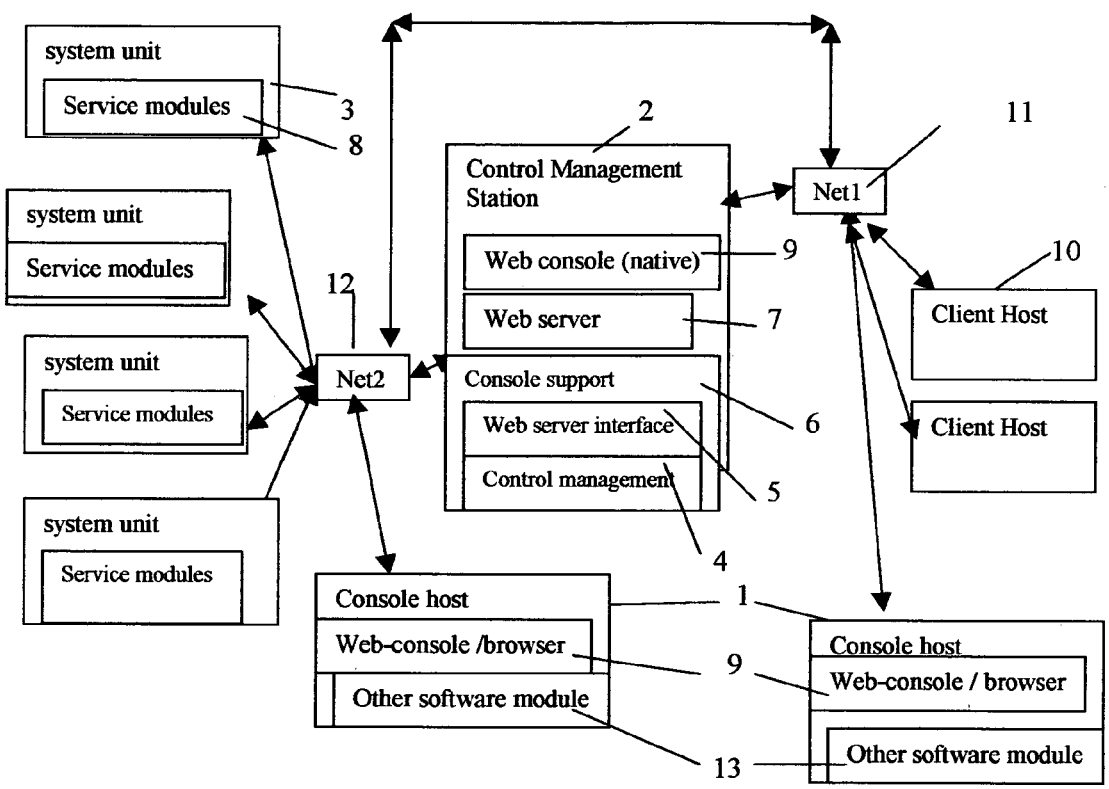
FIG. 2 illustrates an example of a simplified multi-tasks support on Web-console in a CCDSVM environment.

FIG. 1 illustrates an example of a web-console scheme in a simple environment, which includes a console host 1, a server 3, and a net 2. Console host 1 further includes a web-console 8 having a browser. Server 3 includes a web-console, a web server software 4, and a console support software 5, wherein said console support software 5 further includes web server interface 6 and other service modules 7. It should be noted that the same reference indicators will be used throughout the drawings and the following description to refer to the same or like items.

Console host (1), from which a user is able to perform system tasks or operations for server (3) through web-console (browser) (8) of console host (1) can be any system on the net 2, such as a server, a desktop PC, a laptop PC, a hand held PDA, or a cell phone. The web browser (8) may be commercially available software from any vendor or a proprietary software companies. The web browser 8 is able to handle the web protocol such as HTTP. The console host 1 may also include other software modules (9), which may be implemented with any suitable programming languages such as C, C++, Java, XML, et cetera. Other software modules 9 are used to communicate between said server (3) and said console host 1 using IP, non-IP or any suitable protocols for receiving and/or sending data between said console host 1 and said server (3).

Server (3) could be a web server or any kind of system with web server software includes web server software (4) and console supporting software (5). The console supporting software (5) includes web server interface (6) and other services software modules (7), wherein said other services software 7 operates on native server system. The web server software (4) may be commercially available or proprietary software, which is able to accept and handle the web protocol such as HTTP. A native web-console (browser) (8), therefore, enables a user to access and operate the computer locally.

Net 2 represents a network infrastructure such as Internet and intranet, LAN with all kinds of related network equipment and media such as switch/router, different kind of cables and wireless media.

FIG. 2 shows an example simplified block diagram of an embodiment of CCDSVM. The system includes console hosts 1, a control management station 2, system units 3, a net1 11, a net2 12, and client systems 10. Console hosts (1) could be any system on the net such as a server, a desktop PC, a laptop PC, a hand held PDA, or a cell phone. A web-console (web browser) (9) can be used to access and operate the entire CCDSVM. The web browser (9) may be commercially available software from any vendor or proprietary software company. The web browser 9 is able to handle web protocol such as HTTP. A difference between a web-console 9 and a web browser is that the web-console 9 is capable of accessing system information and performing system operation in the CCDSVM environment. The console host may also include other software modules (13), which may be implemented with any suitable programming languages such as C, C++, Java, XML etc. These software modules may be used to facilitate communications between control management station (2) and console hosts 1 using IP, non-IP or any suitable protocols for receiving or sending data between console host and control management station (2). To support a non-web-based networked console, the software used by the web console 9 is configured to handle protocol other than web protocol (HTTP) and communicate with console supporting software on control management station.

Control management station (2) could be any system on the net such as a server, a desktop PC, a laptop PC, or others. The control management station includes web server software (7) and console supporting software (6). The console supporting software (6) includes web server interface software modules (5) and control management software modules (4). It should be noted that the console supporting software 6 may include others service software modules. It may also have native Web browser used as a web-console (9) of native system. The web server software (7) discussed earlier could be commercially available software from a major vendor or other proprietary software company, which is able to accept and handle the web protocol such as HTTP. The web server software (7) sends data to and receives data from web-console 9 of console hosts 1.

The console supporting software (6) can be implemented with any suitable languages such as C, C++, Java, XML, etc. or even implemented by using a combination of different languages as long as it provides the features and functionality described in this invention. That means it is language independent. In addition, the communication protocol used between console support software (6) and service software modules (8) of system units (3) could be any suitable protocol such IP based, or non-IP based or other protocols.

There may be several fixed threads being created based on control management software modules (4). There are may be various number of threads that are created based on web server interface software modules (5) for each tasks being initiated by a user at the web-console 9. All of these threads may be communicated with each other through inter-process communication based on web interface modules (5) and control management module (4), which are simply referred to the thread of console supporting software (6). However, to simplify the discussion, they may be just referred to console supporting software (6) without mentioning the thread at all.

If there is a need to support a less effective non-web-based networked console, there is no need for web server software (7) and web server interfacing software module (5) to be employed. Instead, an additional network software module is required and it could be implemented with any suitable programming language and any suitable communication protocol other than web protocol (HTTP). This network software module can communicate with networked console software on console host (1) via network link and further to communicate with the rest of console supporting software (6) via inter-process communication mechanism.

System unit (3) could be any system on the net such as a server, a desktop PC, a laptop PC, a hand held PDA, a cell phone, any operational system, a video server, a web server, a storage block data server (SAN unit), a video monitoring device, and so forth. The system unit contains service software modules (8), which are capable of communicating with the outside world. For example, service modules 8 is used to communicate with control management software (4) of control management station (2) for carrying out the tasks, or to communicate with clients 10 of CCDSVM for delivering the services to them, or to communicate with another system unit (3) for transferring the data. The service software modules could be implemented with any suitable programming languages such as C, C++, Java, or others. It should be noted that the communication protocol could be any suitable protocol such as IP (Internet Protocol) base or other non-IP based protocol.

The net1 11 represents any kind of communication link between control management station (2) and web-console (9) or client hosts (10). The link could be an infrastructure of internet, intranet, LAN, or others. The link could use connection media such as cable (Ethernet, optical Fibre, and other), wireless media, bus. The link could also use communication equipment such as switches, routers, and/or adapters.

The net2 (12) represents any kind of communication link between control management station (2) and the system units (3) or web-consoles (9). The link could be an infrastructure of internet, intranet, LAN, or other. The link could use connection media such as cable (Ethernet, optical Fibre, and other), wireless media, bus, and could use communication equipment such switch/routers/adapter etc.

Client systems (10) are not part of CCDSVM but they may requests services from CCDSVM, as shown in FIG. 2. The role of client systems and the connections between client system (10) and system unit (3) will not be described in this invention since they are irrelevant to this invention.

FIG. 3 illustrates a simplified data flow between web-console (9 of FIG. 2) on console host (1 of FIG. 2) and the console supporting software (6 of FIG. 2) on control management station (2 of FIG. 2). Data travels from web-console (9 of FIG. 2) to console supporting software (6 of FIG. 2) includes two steps. First, data goes from web-console (9 of FIG. 2) to web server software (7 of FIG. 2) via net (11 or 12 of FIG. 2). Second, console supporting software (6 of FIG. 2) gets data from web server software (7 of FIG. 2) via inter-process communication. To simplify the discussion of this invention, this data traveling path will simply refer to as console supporting software (6 of FIG. 2) getting data from web-console (9 of FIG. 2) or refer to as the data being sent from web-console (9 of FIG. 2) to the console supporting software (6 of FIG. 2).

Data travels from console supporting software (6 of FIG. 2) to web-console (9 of FIG. 2) includes two reverse steps. First, the web server software (7 of FIG. 2) gets data from console supporting software (6 of FIG. 2) via inter-process communication. Second, the web server software (7 of FIG. 2) sends data to web-console (9 of FIG. 2) via net (11 or 12 of FIG. 2). To simplify the rest discussion in this invention, this reverse data traveling will refer to as data being sent from console supporting software (6 of FIG. 2) to web-console (9 of FIG. 2) or refer to as web-console (9 of FIG. 2) gets data from console supporting software (6 of FIG. 2). The terms data, information, and information on a web page will be used interchangeably herein.

Figure 4:
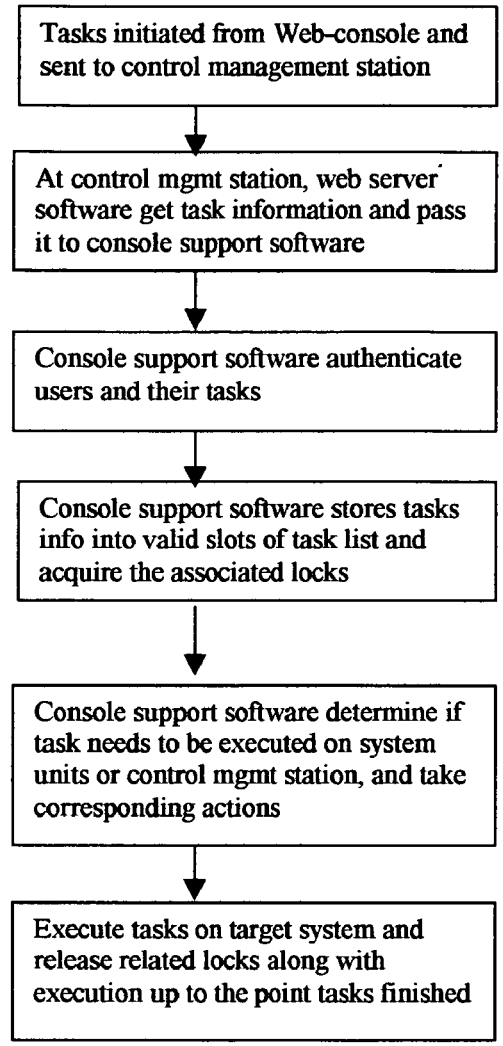
FIG. 4 illustrates an example of a task and an operation processing flow chart in a CCDSVM environment.

FIG. 4 shows the basic tasks and operation processing flow chart, which initiated from web-console.

Figure 5:
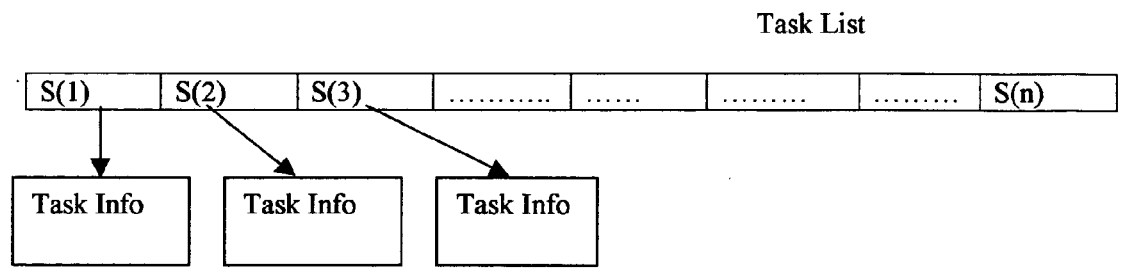
FIG. 5 illustrates a user space task list, which includes an abstraction of data structure for multiple simultaneous concurrent tasks and operations control in CCDSVM environment.

FIG. 5 shows a user space task list. Each slot on the user space task list can be used to hold task information relating to a task issued from Web-console.

Figure 6:
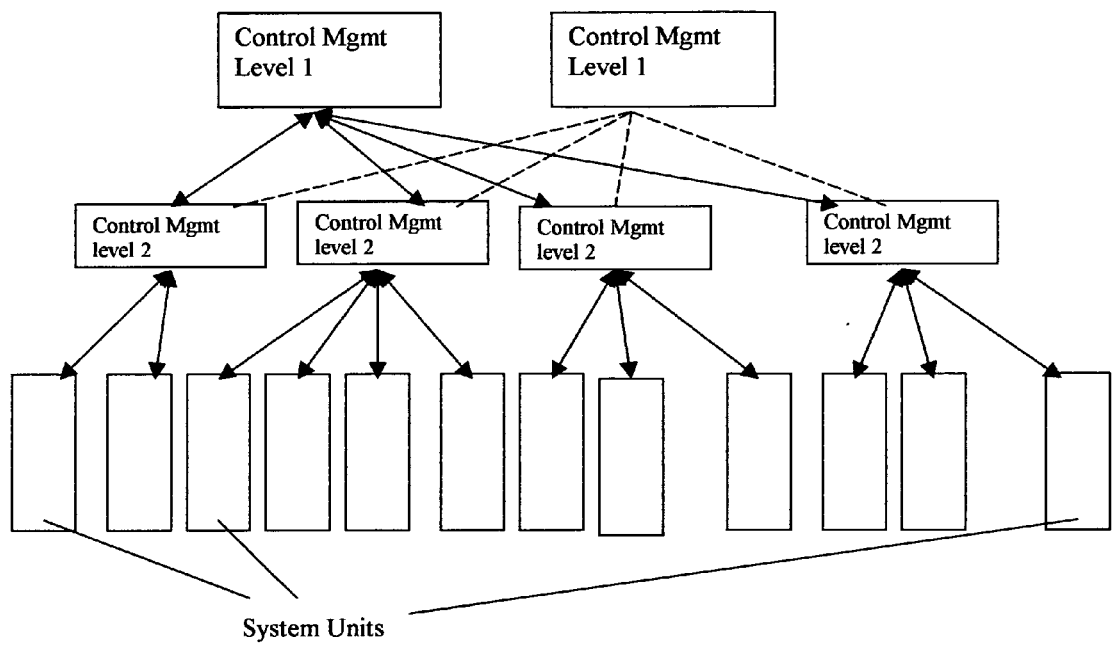
FIG. 6 illustrates a layered CCDSVM structure.

FIG. 6 illustrates a layered CCDSVM environment, which provides a flexible scalability mechanism to efficiently support thousands of heterogeneous system units. With this structure, a control management station (2 of FIG. 2), which is situated at middle layer 2 becomes a system unit of the up layer1.

Figure 7:
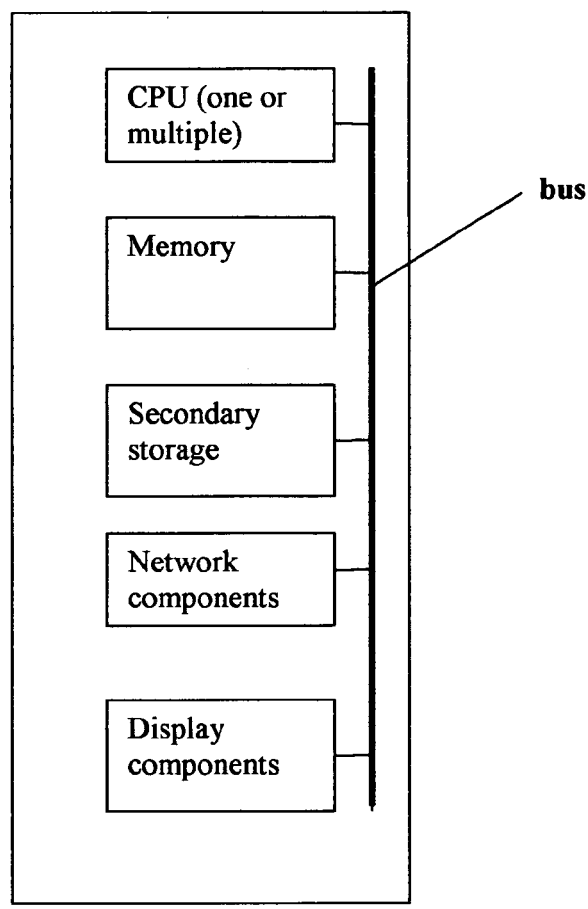
FIG. 7 illustrates typical hardware components including a control management system, system units, and console hosts. It consists of one or more CPU, memory, secondary storage such as disks or memory sticks, the network interface cards, and display components such as monitor or others. These components are connected through buses.

FIG. 7 illustrates typical hardware components including a control management system, system units, and console hosts. It consists of one or more CPU, memory, secondary storage such as disks or memory sticks, the network interface cards, and display components such as monitor or others. These components are connected internally through buses.

The detailed explanation of FIG. 2 will show that how multiple concurrent tasks can be initiated from a web-console (9 of FIG. 2) and can be executed either on any one of the system units (3 of FIG. 2) or on a control management station (2 of FIG. 2) according to this invention.

In one example, a user A at a web-console (9 of FIG. 2) receives an authentication from the console supporting software (6 of FIG. 2). In one embodiment, a successfully login on a control management station (3 of FIG. 2) is considered an authentication because it authorizes user A to access the system. So that user A has obtained necessary information about all system units (3 of FIG. 2) and control management station (2 of FIG. 2) from console supporting software (6 of FIG. 2). When user A initiates a task for a selected target system, which is either a system unit (3 of FIG. 2) or the control management station (2 of FIG. 2), the task information is transmitted via net (11 or 12 of FIG. 2) from web-console (9 of FIG. 2) to the console support software (6 of FIG. 2) on control management station (2 of FIG. 2). A thread is created based on console support software (6 of FIG. 2) wherein the thread will serve and carry out this task. The created thread stores the task information into a valid entry on a user level task list (FIG. 5) and obtains related locks. This ensures that the multiple tasks can be initiated simultaneously within the same web-console (9 of FIG. 2) without delaying, effecting or block other potential thread(s). In addition, multiple web-consoles for multiple simultaneous users anywhere on the net (11 or 12 of FIG. 2) also can be supported. The obtained locks for this task will be properly released one at a time along with the task execution up to a point when the task is finally finished. Therefore, each task could be executed without time delay.

If the total tasks initiated from web-console (9 of FIG. 2) have succeeded the maximum allowed tasks by console supporting software (6 of FIG. 2), the initiated task is failed. The locks will be released by the corresponding thread and the user A on web-console (9 of FIG. 2) is notified correspondingly via net (11 or 12 of FIG. 2).

If an existing task is in a stage of changing a resource object on a target system and if a newly created task will change on the same resource object on that target system, the newly initiated task may fail or may have to wait until the previous task is finished. Further, if a task is failed, the locks associated with the task will be release by the thread and the user A on the web-console (9 of FIG. 2) will be notified via net (11 or 12 of FIG. 2) by console support software (6 of FIG. 2).

The credential of executing a specific task on a specific target system by user A is checked. In addition, the ordinary users' access & operation permissions and credentials are setup by the administrator of the system with supervisor user or special privileges. If user A is not permitted to perform any task on such target system or is not permitted to perform such task on any system, the task execution will fail and user A will be notified via net (11 or 12 of FIG. 2). Otherwise, the task will be carried out by the corresponding thread on the target system, which is either a control management station (2 of FIG. 2) or a system unit (3 of FIG. 2). If there is a need, the console supporting software (6 of FIG. 2) will send the results (or data) back to web-console (9 of FIG. 2). When a task is neither failed nor succeeded, the threads of console supporting software (6 of FIG. 2) will release the locks acquired for this task.

If the task needs to be executed on the control management station (2 of FIG. 2), the thread created based on console supporting software (6 of FIG. 2) will carry out this task. The threads of console support software (6 of FIG. 2) also need to determine if they need to create another thread to execute this task. If there is a need, another thread will be created to execute this task. Once the task is finished, the corresponding locks will be released by console supporting software (6 of FIG. 2).

If a task needs to be executed on a system unit (3 of FIG. 2), the console supporting software (6 of FIG. 2) will transmit the task information via net2 (12 of FIG. 2) to the service software module (8 of FIG. 2) of target system unit (3 of FIG. 2). The thread based on service software module (8 of FIG. 2) of target system unit (3 of FIG. 2) will carry out this task. The service software module (8 of FIG. 2) on target system unit (3 of FIG. 2) needs to determine if an additional thread needs to be created in order to execute such task. If there is a need, an additional thread is created to execute this task. Once the task is finished on the target system unit (3 of FIG. 2), the corresponding status of the task execution is transmitted back to the console supporting software (6 of FIG. 2) of the control management station (2 of FIG. 2). Upon receiving the task finished status, the locks associated with the thread of console support software (6 of FIG. 2) for that task are released.

The Task Issued From Web-Console

The multiple concurrent tasks issued from a web-console (9 of FIG. 2) by a user could be any of the followings:

a) Move or transmit data such as a multiple gigabytes of file or other data in any form from any point or any system to another point or system within CCDSVM (FIG. 2).

b) Configure, partition and assign entire storage system (raid/disk) within CCDSVM (FIG. 2).

c) Setup authentication of specific user from a specific web-console (1 of FIG. 2) with certain privilege for entire CCDSVM or for a specific system, which could be any system unit (3 of FIG. 2) or a control management station (2 of FIG. 2). Setting up the steps of authentication process for any specific services on specific system units can also be implemented.

d) Monitor and display activities and status for networks, storage, CPUs, processes and threads in CCDSVM.

e) Create file system, file and directory structures, and all other related data file operations on either the control management system (2 of FIG. 2) or system units (3 of FIG. 2).

f) And all other kind of tasks and operations, which might be run in other OS (operating system) environment.

The capability of providing user with the multiple concurrent simultaneous operations and tasks on web console (9 of FIG. 2) has indicated that this invention has created a web-based user work environment on top of an existing operating system of a single or multiple computer systems. Further, this is a consistent working environment for a computer system since it allows a user to access exact the same working environment through the web-console (9 of FIG. 2), which could be a web browser either on a native system or from other remote systems.

User Login

The user-login mechanism is also supported by the console supporting software (6 of FIG. 2). The web-console (9 of FIG. 2) obtains a login web page from the console supporting software (6 of FIG. 2) via the net (11 & 12 of FIG. 2). Once the user provides an account name and a password for the login page on the web-console (9 of FIG. 2), the authentication information is sent to the console supporting software (6 of FIG. 2) for validation. Upon successful validating the user account and password information, the console support software (6 of FIG. 2) sends all necessary system information such as IP address to web-console (9 of FIG. 2), which includes the information of control management station (2 of FIG. 2) and system units (3 of FIG. 2).

The Maximum Tasks

The maximum multiple concurrent simultaneous tasks that can be initiated from web-consoles are determined by console support software modules (6 of FIG. 2), and they are also determined based on the needs and the capacity of the control management station (2 of FIG. 2).

The Credential Checking

The credential of a user includes the permission to access all or partial systems, or a single system within CCDSVM. The credential further includes the permission to run all tasks or partial tasks, which lists the previous section of "The Task Issued From Web-Console". It also includes the permission of accessing specific size of storage volumes. For example, user B may be granted a permission to run tasks on systems X, Y, and Z. Another user C may be granted a permission to run tasks on entire system in the CCDSVM environment. User C might be allow to get system status on systems X, Y, and Z only while user B allows to run all tasks on systems X, Y, and Z. Each system mentioned here could be a control management station or any of system units. This basically represents a two-level authentication policy and checking. The first level is the security imposed by the control management station (2 of FIG. 2) and the second level is the security imposed by system units (3 of FIG. 2).

The Web-Server Interface Software Module

The web-server interfacing software module (5 of FIG. 2) is responsible to get information from or send information to web server software (7 of FIG. 2). It also interacts with control management modules (4 of FIG. 2) via inter-process communication and communicates with service module (8 of FIG. 2) of system unit (3 of FIG. 2) via net2 (12 of FIG. 2).

The Control Management Software Module

The control management module (4 of FIG. 2) on the control management station (2 of FIG. 2) is responsible for communicating with system units (3 of FIG. 2). It sends data to or receives data from system units via net2 (12 of FIG. 2). It also provides information of system units (3 of FIG. 2) to web interface software modules (5 of FIG. 2) of the control management station (2 of FIG. 2) via an inter-process communication mechanism.

The Layered CCDSVM Structure

To be more efficiently support multiple concurrent tasks over a larger number of system units (3 of FIG. 2), the CCDSVM can be organized into a multi-layer structure (FIG. 6). With this layered structure, the CCDSVM can be subdivided into different groups. For example, each level-2 control management station could function as both control management station (2 of FIG. 2) to the system units below it and could function as a system unit (3 of FIG. 2) for level-1 control management station. Therefore, it must have related software modules for both the control management station and system units.

What is claimed is:

1. A computer system for supporting multiple simultaneous concurrent tasks within a single web browser in a central controlled distributed scalable virtual machine (CCDSVM) environment over a network, said computer system comprising:

one or more Console Hosts, from which a user for each of said one or more Console Hosts is able to perform system tasks through a web browser;

one or more System Units, each configured with service modules;

a Control Management Station comprising a web browser, web server software, and console supporting software, wherein said console supporting software comprises of web server interface software modules and control management software modules;

wherein said service modules of said one or more System Units are coupled with said console support software of said Control Management Station and said one or more Console Hosts over the network to support running multiple simultaneous concurrent tasks within a single web browser by the following:

wherein each user logs into said CCDSVM environment from the web browser of said one or more Console Hosts on the network, such that each user can obtain information of said one or more System Units and said Control Management Station, wherein each user selects one of said System Units or Control Management Station as a Target System, initiates and submits tasks to the selected Target System based on each user's authentication of certain privileges, which can run concurrently within said each user's single web-browser in said CCDSVM environment, based on said obtained information of said one or more System Units and said Control Management Station in addition to said user authentication of certain privileges;

wherein said console supporting software on said Control Management Station receives and stores said submitted tasks into a user space task list and obtains associated locks for each of the tasks; and wherein said console supporting software on said Control Management Station distributes said tasks to be executed on said Target System until all of said tasks are performed and releasing said locks along with the task execution.

2. A method for supporting multiple simultaneous concurrent tasks within a single web browser in a central controlled distributed scalable virtual machine (CCDSVM) environment over a network, said method comprising:

providing one or more users to perform user space tasks through a web browser on one or more Console Hosts;

configuring one or more System Units with service modules, wherein said service modules of said one or more System Units are coupled with console software of a Control Management Station and said one or more Console Hosts over the network to support running multiple simultaneous concurrent tasks within a single web browser by the following:

logging in by each user into said CCDSVM environment from the web browser of said one or more Console Hosts on the network, such that each user can obtain information of said one or more System Units and said Control Management Station, wherein each user selects one of said a System Units or Control Management Station as a Target System, initiates and submits tasks to the selected Target System based on a user authentication of certain privileges;

wherein said tasks can run concurrently within said single web-browser in said CCDSVM environment, based on said obtained information of said one or more System Units and said Control Management Station in addition to said user authentication of certain privileges;

wherein said console support software on said Control Management Station receives and stores said submitted tasks into the user space task list and obtains associated locks for each of the tasks; and wherein said console supporting software on said Control Management Station allocates said tasks to be executed on said Target System until all of said tasks are performed and said associated locks along with the task execution are released.

3. The method of claim 2, further includes:
said software modules of said Control Management Station providing a login web page to said user;
said software modules of Control Management Station providing said user a mechanism to input password and account information on said login web page;
said web-browser of said one or more Console Hosts transmitting the authentication information to said console support software of said Control Management Station.

4. The method of claim 2, further includes:
said software modules of said Control Management Station performing authentication and validation checking after receiving said authentication information, wherein said authentication validation checking further includes determining whether a user is allowed to login.

5. The method of claim 2, further includes:
said software modules of said Control Management Station allows a plurality of users, each from the web browser of said one or more Console Hosts on the network, to concurrently login to said CCDSVM environment.

6. The method of claim 2, further includes:
said obtained information of each System Unit and Control Management Station are related to and are used by said user to initiate tasks; and
said obtained information comprises of resource and configuration information of said system units and control station.

7. The method of claim 2, further includes:
said software modules of said Control Management Station allowing said user to initiate one or multiple simultaneous concurrent tasks from a single web-browser of a Console Host for a Target System or for several different Target Systems based on said obtained information;
task information is transmitted from said web-browser of said Console Host to said software modules of said Control Management Station;
wherein said tasks could be any of the following:
moving or transmitting data such as a multiple Gig-bytes data file to and from any location within the CCDSVM network environment;
configuring entire resources in the CCDSVM environment;
configuring, partitioning, and assigning the entire storage system within the CCDSVM environment;
setting up authentication of a specific user from a specific web browser with certain privileges for said Target System, or a plurality of Target Systems;
setting up authentication for a client to obtain services of the CCDSVM environment;
monitoring and displaying network, storage, CPU, processes and thread activities and status for the CCDSVM environment; and
creating and mounting a file system, file and directory structures, and performing all related data file operations on either Control Management Station or System Units; and
performing tasks that are compatible to tasks in a regular native computer user work environment.

8. The method of claims 2, further includes:
allowing multiple users on different Console Hosts to each login to the CCDSVM environment through a web browser such that multiple simultaneous concurrent tasks for a Target System or for a plurality of Target Systems can be initiated.

9. The method of claim 2, further includes:
software modules of said Control Management Station receives task information from said web browser of said one or more Console Hosts;
software modules of said Control Management Station stores information of each task one at a time into a valid slot of said user space task list;
software modules of said Control Management Station acquires associated locks to protect resources used by each task and further to prevent each task from interfering or blocking each other.

10. The method of claim 2, including:
wherein said locks acquired for each task are conventional or non-conventional locks;
wherein said conventional lock can be acquired and released by the same thread; and
wherein said non-conventional lock can be acquired by one thread and released by another thread.

11. The method of claim 2, further includes:
if the Target System for a task is a System Unit, then said software modules of said Control Management Station transmits the task information to said service software modules of said Target System and said service software modules of said Target System performs the task; and
if the Target System for a task is the Control Management Station, then said software modules of said Control Management Station performs the task.

12. The method of claim 11, further includes:
creating threads of the software modules of the Control Management Station to perform the task on the Control Management Station
creating threads of said service modules of the System Unit to perform the task on the System Unit.

13. The method of claim 2, further includes:
said software modules of control station determines whether said user is permitted to run a specific task, and to determine whether said user is permitted to run a task on a specific system.

14. The method of claim 2, further includes:
wherein said associated locks are released one at a time along with each task's executing up to a point where the task is completed.

* * * * *